Patented Sept. 2, 1952

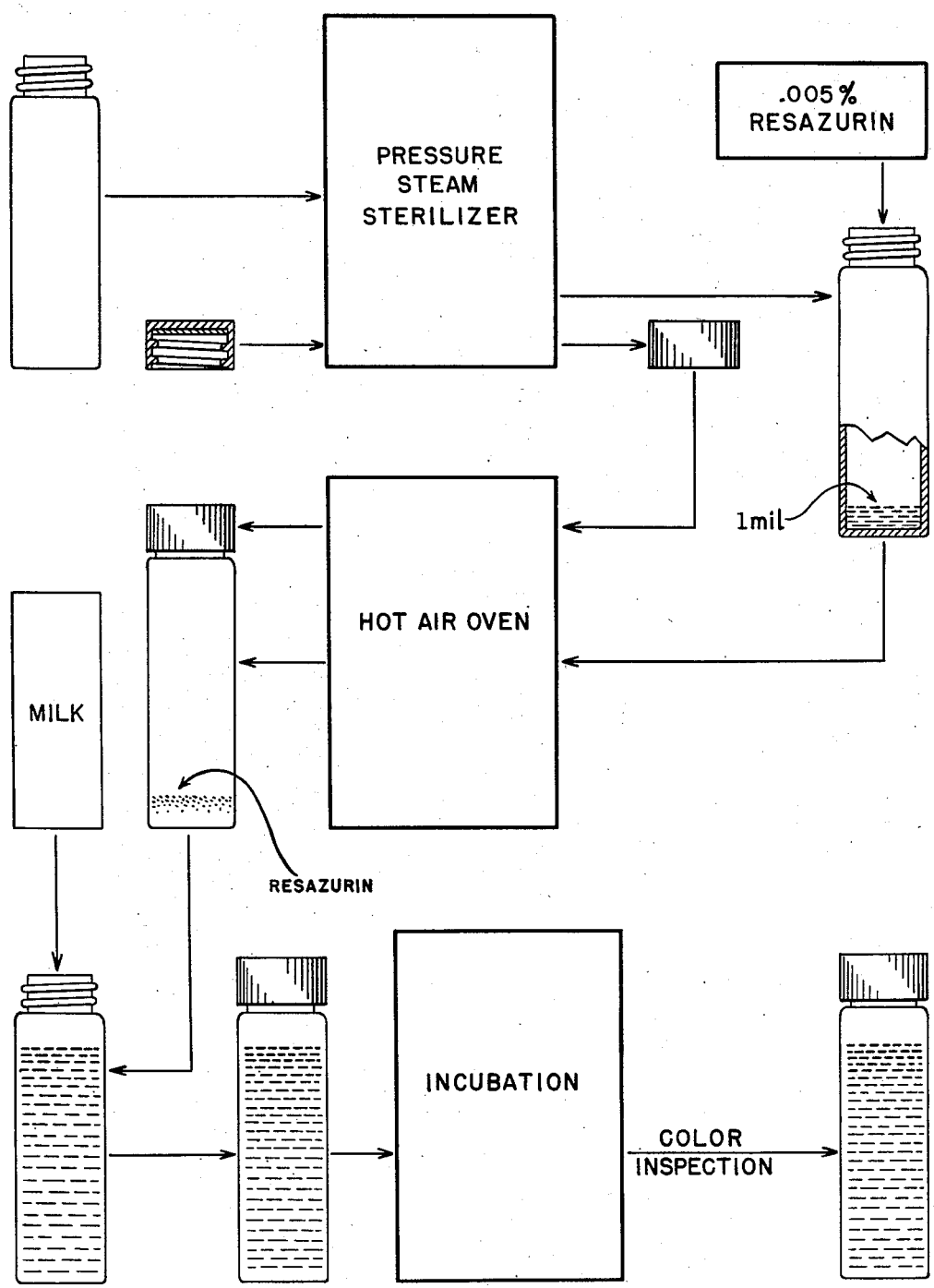

2,609,275

UNITED STATES PATENT OFFICE

2,609,275

RESAZURIN TEST FOR MILK

Norman S. Golding, Pullman, Wash., assignor to State College of Washington Research Foundation, Pullman, Wash., a corporation of Washington Application June 12, 1946, Serial No. 676,327

1 Claim. (Cl. 23—231)

The present invention relates to certain new and useful improvements in a resazurin test for milk and is particularly directed to an improved means and method which eliminates the time and effort usually required for individually measuring the required amount of resazurin solution into each milk sample at the time the tests are made.

There is a widespread recognition of the value of the resazurin test for grading the bacterial quality of milk, and numerous skilled workers have made extensive investigations in an effort to arrive at a satisfactory correlation between the color reactions of the resazurin dye and the bacterial population of the milk.

The resazurin dye used for this purpose is in reality sodium resazurate, but it is conventional language in this art to refer to it by the unqualified term resazurin, and that is the sense in which the term is used in the present disclosure.

It is well known that resazurin is an oxidation-reduction indicator which is readily reduced by bacterial population in milk, and the greater the bacterial population, the faster the resazurin is reduced.

It is conventional practice to add 1 milliliter of a .005% solution of resazurin to a 10 milliliter sample of milk in a test tube and then subject the sample to incubation so as to determine the extent of color change occuring in a stated time interval, or else the length of time required to produce a certain color change arbitrarily adopted as an end-point.

It is well known that when the resazurin solution is added to a milk sample, the normal purple color of the dye is changed to blue, and as bacterial reduction of the resazurin gradually progresses, there is a succession of color changes in the regular sequence of blue, lilac, mauve, pink-purple, purple-pink, and pink, and then colorless. These color changes have been officially recognized by the British government as a standard guide, and there is available upon the open market, the well known Lovibond comparator having colored glass discs which operate over a tube of milk so as to simulate these color changes of the resazurin in milk. These glass discs are numbered from 6 to 1, ranging from blue down to pink, and there is a colorless disc labeled O. These Lovibond glass discs and their numbering is the official standard in England where they are also called Tintometer discs. It is conventional practice to designate any of these color changes by number instead of by name.

In the conventional practice, when milk arrives on the receiving platform of the dairy, a 10 milliliter sample is taken from each can, and each sample is placed in a test tube which is then stoppered and numbered and placed on ice until the testing can later be done elsewhere, as there is seldom room enough on the receiving platform to enable the testing to be conducted there. The iced samples are later transferred to the laboratory and 1 milliliter of .005% resazurin solution, is added to each milk sample and the contents are agitated sufficiently to mix them. The numbered test tubes are then placed in an incubator, the time is noted; and subsequently, the samples are inspected and notation made of any color change and the time interval thereof. The incubation temperature is usually 37° C., and the time interval may be 10 minutes, 30 minutes, 1 hour, or longer, depending on the object sought for and the bacterial population of the various samples of milk. The 10 minutes incubation is particularly serviceable as a rapid platform test for detecting badly contaminated milk, so as to prevent it from becoming mixed with better grade milk. These various forms of resazurin tests are widely known, and are here mentioned merely as an environment for the present invention.

Obviously, milk must move rapidly from the receiving platform, and any saving in the time required for sampling the milk, is a matter of consequence and importance to any dairy which handles a large volume of milk daily.

The present invention eliminates the step of adding the resazurin solution to each sample of milk; and instead, I provide a sterilized screw cap vial having the required amount of dried resazurin adherent to the inner walls thereof, in immediate readiness to receive a sample of milk. This saves considerable time and effort and greatly speeds up the work. It also eliminates the prior art practice of icing the milk samples, and enables the incubation to be started immediately on the receiving platform, thus affording a more prompt determination of the bacterial quality of the milk, which is of paramount importance where milk must be graded as rapidly as possible so as to determine what disposition should be made of the various qualities received.

The invention is illustrated in the accompanying drawing which shows a flow sheet disclosing the method of preparing the sterilized vials with the dried resazurin adherent to the inner walls thereof, and then adding the milk to the vial and conducting the incubation for color reaction of the resazurin.

As here shown, the vials and their screw caps are subjected to pressure steam sterilization, preferably at 120° C.; and it will be understood that the commercially obtainable washed vials are employed. Here the single vial is representative of whatever multiplicity the sterilizer will accommodate. After sterilization, 1 milliliter of a .005% solution of resazurin is measured into each vial; as for instance, a multiple pipette or other suitable device may be employed for this purpose. The screw caps and vials are then placed in a hot air oven preferably at a temperature of 105° to 110° C. for sufficient length of time to evaporate the resazurin solution and fully dry the resazurin which normally adheres to the walls of the vial as a faintly visible ring, in the manner illustrated in the drawing, where the amount of resazurin is exaggerated for the sake of clarity. The dried vials are preferably cooled in the oven, and then promptly capped. Any length of time may elapse between this stage of the process and the next step of adding the milk sample to the vial, or in a large dairy the complete procedure might be one continuous process.

These vials containing the resazurin adherent therein, constitute an article of manufacture; and the resazurin being dry and sealed, it will not deteriorate. This eliminates the precaution which must always be exercised to assure that the resazurin solution has not deteriorated.

These vials with the resazurin adherent therein can be prepared in quantity during the lax time of the day, so that an ample quantity will be in readiness for the peak period when milk arrives on the receiving platform, or else the prepared vials can be purchased in quantity.

In any event, as illustrated in the drawing, the milk sample is placed in the vial and the screw cap is replaced thereon. The contents are mixed by twice inverting or else by mild shaking, and the samples are then subjected to incubation for the desired time interval, after which they are subjected to color inspection and graded accordingly.

The present invention is not concerned with the particular manner of grading; but it may be well to mention that any samples which show an abrupt color change within 10 minutes should be rejected. The incubation can then continue for 30 minutes, and any samples which show sufficient color change, can be utilized as a guide for segregating that milk until its acceptability is determined. The longer periods of 1 hour or more may be utilized for standard grading, or else to disclose where proper superintendence of the source of supply will improve the sanitary condition of the milk. There is abundant literature on the subject, and therefore no detailed discussion is necessary here. However, it should be remarked that resazurin is also reduced by leucocytes, and therefore the presence of mastitis will cause a color change; but this too is a matter of grading and can be dealt with accordingly.

These vials containing the resazurin adherent therein, also enable the dairy farmer to make tests himself, to determine the source of contamination. As for instance, he may take a sample at any stage of production, and incubate it by placing it in his shirt pocket so as to derive body heat. In this manner, he may determine for himself, at just what point in the production, the contamination occurs, and thus correct the condition. Any such investigation can readily be done without a comparator, it being sufficient to merely note the length of time required to reach the pink stage.

In preparing the vials according to the herein described method, the resazurin content should be carefully standardized so as to assure that the color intensity will closely match the color discs of the comparator. The resazurin dye contains sodium carbonate and it is well known that some specimens are deficient in the amount of resazurin they contain, there being an excess of sodium carbonate, or perhaps part of the resazurin is reduced to resorufin. Any such discrepancy should be corrected by standardizing the resazurin solution to produce the same intensity as the comparator discs. Where these resazurin vials are made in large scale production this color standardization can be accomplished with great uniformity, and a single source of supply can furnish many dairies with vials all affording the same uniform color intensity, which greatly assists in speedy recognition and differentiation of the color changes, and also greatly adds to the value of the determinations for the purpose of statistics and the establishment of uniform standards for the grading of milk.

The described one milliliter of .005% solution affords $\frac{1}{20}$ of a milligram of resazurin for each 10 milliliters of milk, which is the amount legally adopted as the standard in England to match the blue color of the disc numbered 6 on the Lovibond comparator which is also the legally adopted standard in England. This same color intensity can be used for comparing with the well known Munsell Resazurin Color Grader, provided that the technician directs his attention to the color changes, irrespective of the intensity of the colors. If desired, the amount of resazurin may be increased so as to match the greater intensity of these Munsell colors, or any other suitable color standard. This can readily be accomplished by using .006% or .007% or .008% or whatever strength may be required to match the intensity of the color standard being employed. In any event the quantity for each milk specimen will be only a fraction of a milligram. It is essentially necessary to maintain a uniform standard of color intensity so as to facilitate recognition and interpretation; but the invention is not restricted to any particular color intensity. In actual practice, each batch is standardized for color intensity, and care is exercised to discover any variation in the percentage of resazurin contained in the dye employed. In this manner the vials may be made to contain the correct amount for the English standard, or for any standard that may be adopted for the United States or any other country or community.

In practicing the present invention, the described vials containing the resazurin adherent therein, are provided in readiness on the receiving platform. A sample of milk is measured into each vial and the screw cap is replaced and the contents mixed by twice inverting or else by mild shaking, and the vials are forthwith placed in the incubator. They are subsequently inspected for color reaction at whatever time intervals that may be desired, and the results noted. It is of course understood that each vial is numbered and a tabulation sheet with corresponding numerals is used to enter the notations as to time and color changes. Thus it will be seen that the present invention not only eliminates the prior art practice of icing, but due to the fact that the resazurin is already in each vial, there is also eliminated, the prior art practice of measuring the resazurin into each sample of milk, which would be impractical to attempt on the receiving platform. Thus, there is a double saving in time, and inasmuch as the milk samples are ready for incubating as soon as they are placed in the vials, the incubator can be conveniently located on the receiving platform and the whole procedure can be conducted right there, and with considerable saving in time.

It should also be noted that the present invention relieves the operator of the usual efforts of sterilizing test tubes and preparing solutions and sterilizing the same. By eliminating these steps, the present invention enables small dairies having no bacteriologist, to successfully grade their milk with a minimum of effort.

The invention is particularly directed to resazurin but can also be employed with any other dye which shows a color reaction by bacterial growth in milk.

I claim as my invention:

In a method of conducting a resazurin test for milk, the steps which comprise adding to a washed and sterilized vial, a required fraction of a milligram of resazurin in solution, evaporating the same to dryness, closing said vial with a sterilized and dried cap so as to maintain said resazurin in condition to subsequently receive a sample of milk to be tested and thereafter placing a sample of milk in the vial.

NORMAN S. GOLDING.

REFERENCES CITED

The following references are of record in the file of this patent:

UNITED STATES PATENTS

| Number | Name | Date |
| --- | --- | --- |
| 2,452,385 | Merckel | Oct. 26, 1948 |

OTHER REFERENCES

Journal of Dairy Science Abstracts, vol. 27, July-December 1944, page 664.

Todd and Sanford, Clinical Diagnosis by Laboratory Methods, 9th ed., page 347.

Standard Methods for the Examination of Dairy Analysis (1941), Am. Pub. Health Assn., pp. 8, 66 and 67.

Merck's Index, 5 ed. (1940), Merck & Co., Rahway, N. J., page 477.